(12) United States Patent
Sarukkai

(10) Patent No.: US 10,516,746 B2
(45) Date of Patent: Dec. 24, 2019

(54) CORRELATING MEDIA CONSUMPTION DATA WITH USER PROFILES

(71) Applicant: Facebook, Inc., Menlo Park, CA (US)

(72) Inventor: Ramesh Rangarajan Sarukkai, Los Gatos, CA (US)

(73) Assignee: Facebook, Inc., Menlo Park, CA (US)

( * ) Notice: Subject to any disclaimer, the term of this patent is extended or adjusted under 35 U.S.C. 154(b) by 414 days.

(21) Appl. No.: 14/985,089

(22) Filed: Dec. 30, 2015

(65) Prior Publication Data

US 2017/0195435 A1 Jul. 6, 2017

(51) Int. Cl.
| | |
|---|---|
| *G06F 15/16* | (2006.01) |
| *H04L 29/08* | (2006.01) |
| *H04N 21/4788* | (2011.01) |
| *H04N 21/45* | (2011.01) |
| *H04N 21/258* | (2011.01) |
| *H04N 21/254* | (2011.01) |
| *H04N 21/4627* | (2011.01) |
| *H04N 21/8358* | (2011.01) |

(52) U.S. Cl.
CPC ............ *H04L 67/22* (2013.01); *H04L 67/306* (2013.01); *H04N 21/2541* (2013.01); *H04N 21/25875* (2013.01); *H04N 21/25883* (2013.01); *H04N 21/4532* (2013.01); *H04N 21/4627* (2013.01); *H04N 21/4788* (2013.01); *H04N 21/8358* (2013.01)

(58) Field of Classification Search
CPC ....... H04L 67/22; H04L 67/306; G06F 17/30; G06Q 50/01
USPC .................................................. 709/224, 223
See application file for complete search history.

(56) References Cited

U.S. PATENT DOCUMENTS

| | | | |
|---|---|---|---|
| 2008/0117201 A1* | 5/2008 | Martinez | G06F 17/30035 345/418 |
| 2014/0006494 A1* | 1/2014 | George | H04W 4/206 709/204 |
| 2014/0019480 A1* | 1/2014 | Rychikhin | G06F 17/30864 707/770 |
| 2015/0052115 A1* | 2/2015 | Sharifi | G06Q 30/0631 707/722 |
| 2015/0181289 A1* | 6/2015 | Wheatley | H04N 21/44222 725/14 |

* cited by examiner

*Primary Examiner* — David R Lazaro
*Assistant Examiner* — Mariegeorges A Henry
(74) *Attorney, Agent, or Firm* — Baker Botts L.L.P.

(57) ABSTRACT

In one embodiment, one or more computer systems of a social-networking system retrieve a user profile for a user associated with a media device. The one or more computer systems of a social-networking system receive media consumption. The one or more computer systems of a social-networking system correlates the user profile and the media consumption data to determine device-based media consumption data associated with content being consumed on the media device. The one or more computer systems of a social-networking system store data that associates the user profile with the device-based media consumption data.

18 Claims, 9 Drawing Sheets

CORRELATING MEDIA CONSUMPTION DATA WITH USER PROFILES

TECHNICAL FIELD

This disclosure generally relates to analyzing media consumption.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments allow a social-networking system to correlate or merge user profile data of a user of the social-networking system with media consumption data. In some embodiments, the social-networking system determines or captures media consumption data through a user device, a media device, or by receiving data from a content provider. In particular embodiments, media consumption data may be captured by or sent to the social-networking system via a user device, a media device, or a content provider. In particular embodiments, a user device may capture media consumption data and allow a social-network to correlate the media consumption data with a user profile.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
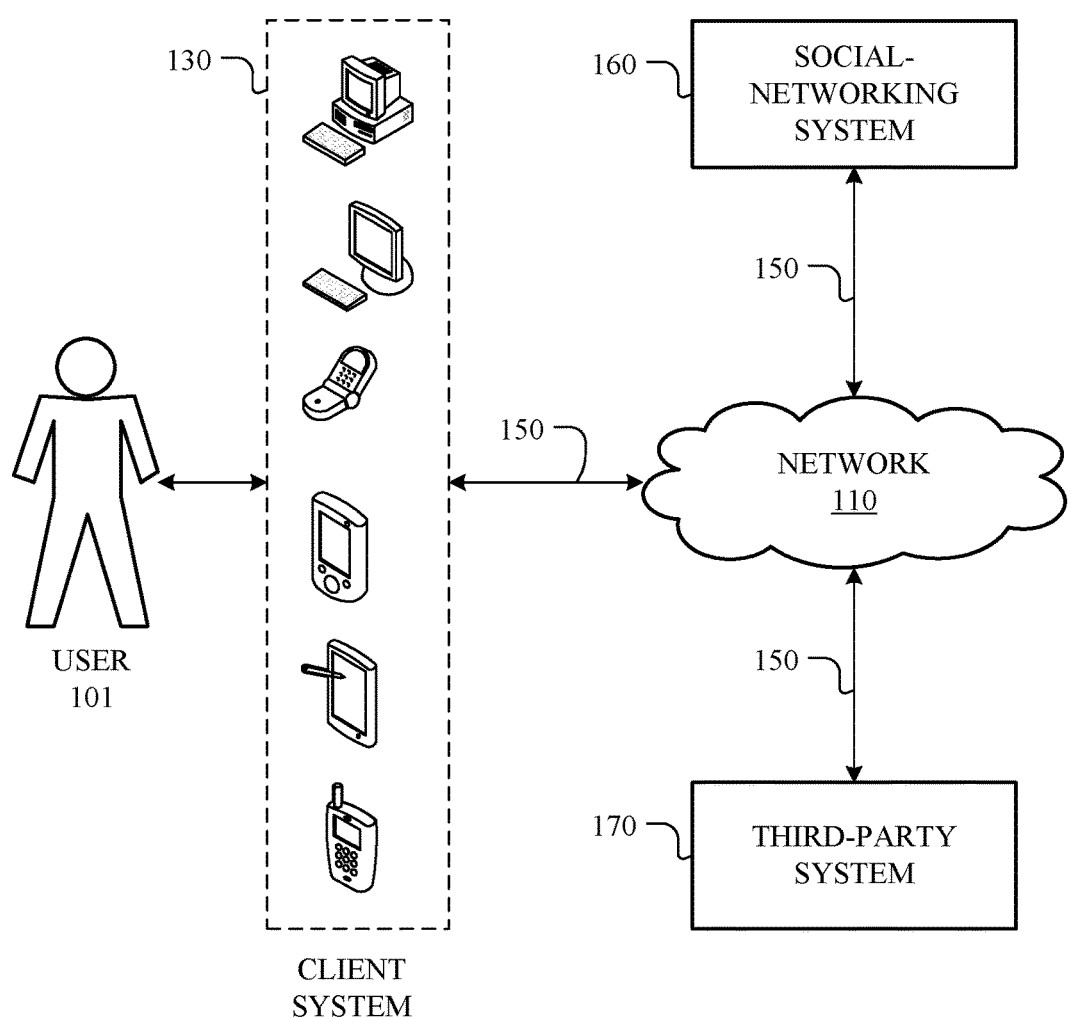
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG.

1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, a tablet computer, or an augmented/virtual reality device.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
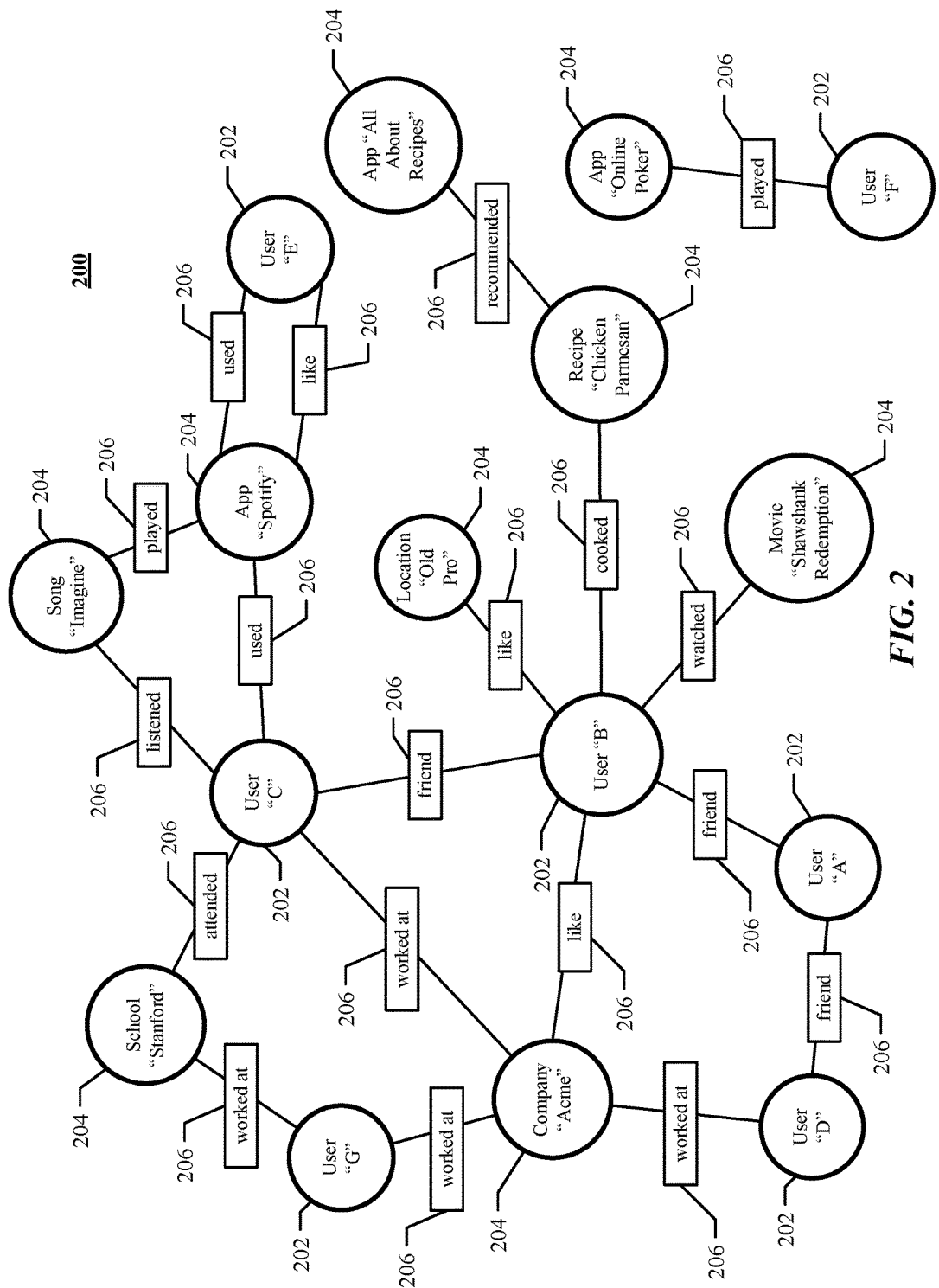
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 3:
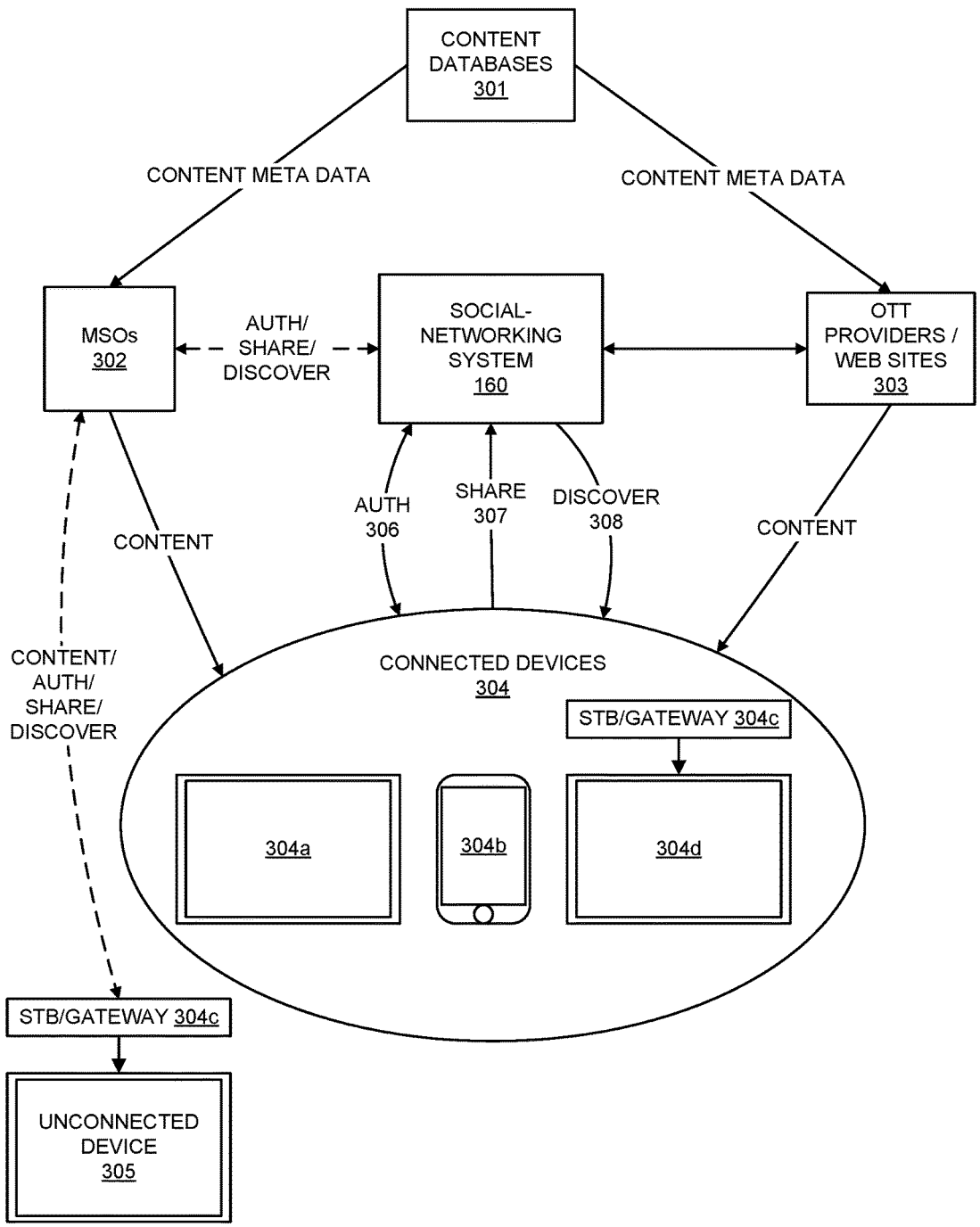
FIG. 3 illustrates an example network environment.

FIG. 3 illustrates an example network environment for some embodiments described in this disclosure. Social-networking system 160 (or any other system capable of performing steps of the methods described in this disclosure) may be connected via network 110 to a plurality of connected devices 304. Connected devices 304 may include, without limitation, Internet-enabled television sets 304a that connect to network 110 through a local internet service provider (ISP), mobile devices 304b that connect to network 110 through a wireless connection such as a wireless cellular data network, or TVs 304d that connect to network 110 through a set-top box (STB) or gateway device 304c. STB/gateway 304c may be any hardware or software that delivers content or possesses a network interface card (NIC) for connecting to a local area network (LAN). For example, STB/gateway 304c may be a cable box provided by a multiple-system operator (MSO), such as COMCAST, TIME WARNER, AT&T U-VERSE, or DISH NETWORK. In such examples, STB/gateway 304c may receive content from MSOs 302. As another example, STB/gateway 304c may be a device that streams video from third-party internet sites or services such as over-the-top content (OTT) providers 303. As an example and not by way of limitation, a gateway device may include devices from ROKU, BOXEE, APPLE TV, or GOOGLE TV that allow users to access content from OTT providers 303 such as NETFLIX, HULU, AMAZON VIDEO, or YOUTUBE. Additionally or alternatively, a gateway device may be a digital video recorder (DVR) or a digital media player (DMP). In some embodiments, STB/gateway 304c may be a stand-alone device. In other embodiments, the functionality of STB/gateway 304c may be incorporated into TV 304d.

In general, a user's social connections or activities can be used to customize or personalize the user's experience with a social TV viewing system such as the system of FIG. 3. Some embodiments may utilize methods to customize a user's experience as described in U.S. patent application Ser. No. 12/759,676 entitled "Token-Activated, Federated Access to Social Network Information," which is incorporated herein by reference. In particular embodiments, connected devices 304 receive content from MSOs 302 or OTT providers 303 while receiving or sending social data to social-networking system 160. For example, a user watching a particular TV show or movie on either service may choose to share that he or she is currently viewing the program to his or her friends. Conversely, a user browsing the Electronic Programming Guide (EPG) of an MSO 302 or the content navigator of an OTT provider 303 may be presented with social data including the content that his or her friends on social-networking system 160 have watched, are currently watching, or plan to watch. Thus, after exchanging authorization messages 306 with social-networking system 160 to authenticate the user's social networking identity with his or her connected device 304, connected devices 304 may receive discover messages 308 that identify content being consumed or watched by his or her friends on the social network, and send share messages 307 to inform social-networking system 160 of what the user has, is, or plans to watch or "consume." Although FIG. 3 depicts these messages as being sent directly between social-networking system 160 and connected devices 304, in particular embodiments, authorization, share, and discover messages 306, 307, and 308 may be exchanged between the provider from which content is being accessed, namely, MSOs 302 and OTT providers 303. This disclosure contemplates any suitable means of routing messages from connected devices 304 to social-networking system 160.

Although increasingly rare, there are scenarios wherein a particular user of the social-networking system has no means of linking his TV or media device to social-networking system 160. Unconnected devices 305 lack any means of connecting to Internet/network 110. For example, a user may not have a local ISP, and only TV service from an MSO. As another example, a user may have both cable service from an MSO as well as interne access from a local ISP, but his or her STB 304c may not include an NIC. In such configurations, MSO 302 may communicate authorization, share, and discover messages with social-networking system 160, and unconnected device 305 may communicate with MSOs 302 (e.g., via STB 304c). In particular embodiments, unconnected device 305 may communicate indirectly with social-networking system 160 via a connected device. For example, and not by way of limitation, mobile device 304b may record audio or video data from unconnected device 305 and send the data to social-networking system 160.

In particular embodiments, content may be delivered to user devices 304 and 305 tagged with content identifiers and metadata. For example, COMCAST may utilize its own proprietary EPG data format that lists the program name, air date, actors, producer, director, etc. In particular embodiments, content providers 302 and 303 may obtain content identifiers and metadata from content databases 301, such as that provided by ROVI. Each particular piece of content may be sent from devices 304, or, in particular embodiments, via content providers 302 and 303, as graph data including a graph object and graph action. Social-networking system 160 may de-duplicate graph data for the same graph object in a graph data store by comparing various attributes about the content object; for example, name, actors, duration, air date, etc. Thus, social-networking system 160 may attribute graph data sent from HULU that a particular user watched the critically-acclaimed feature film "The Marine" to the same graph object as a user currently watching "The Marine" on COMCAST digital cable, irrespective of the source and format of the content metadata.

Figure 4:
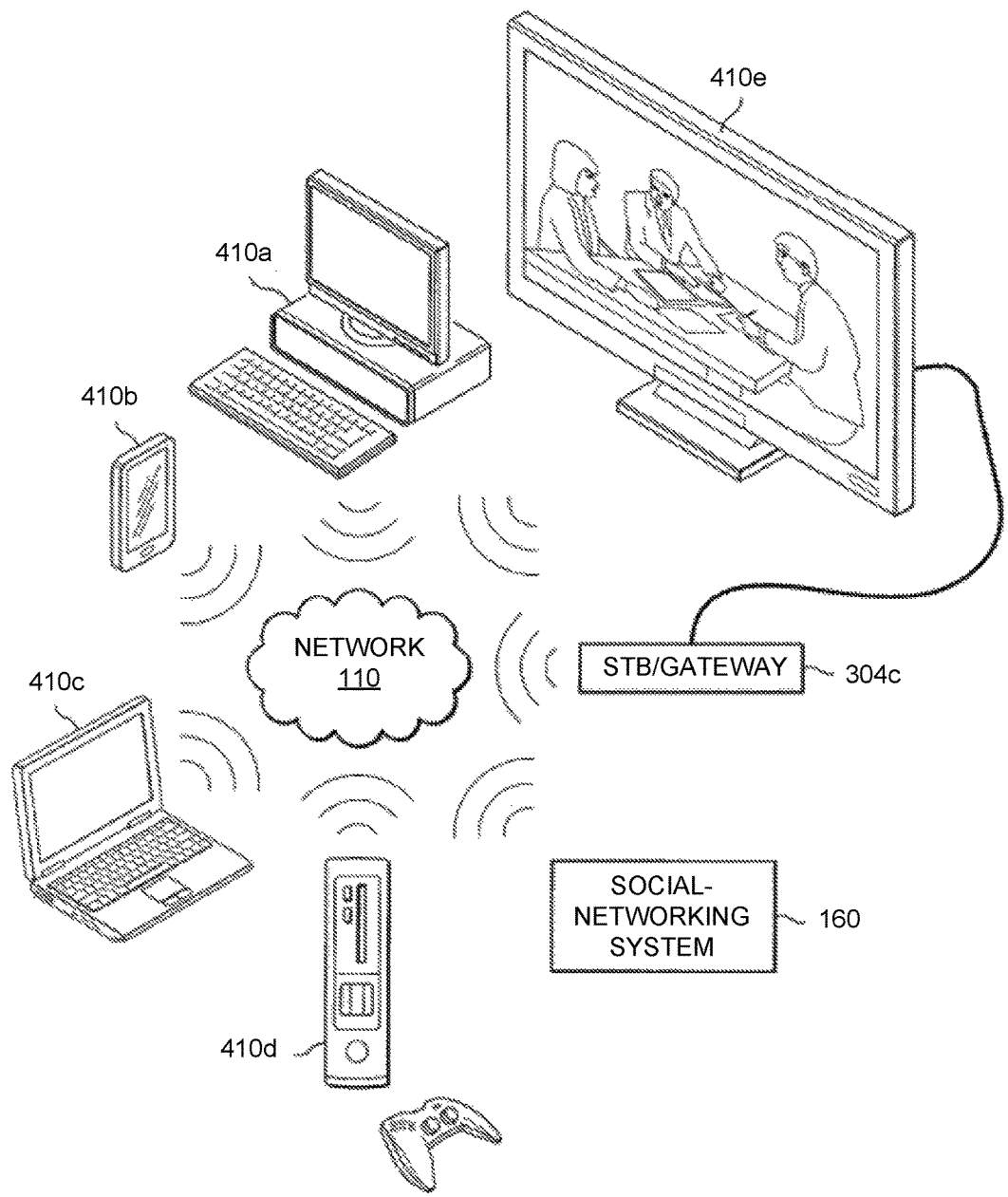
FIG. 4 illustrates an example environment in which a social-networking system may identify a user of a user device.

FIG. 4 illustrates an example environment in which social-networking system 160 may identify a user of one or more user devices 410. In the illustrated embodiment, user devices 410 may include a personal computer 410a, a mobile device 410b such as a smartphone, a laptop computer 410c, a gaming console 410d, a TV 410e, or any other appropriate user device. User devices 410 may communicate with network 110, STB/gateway 304c, or other user devices 410 via a wireless communications protocol such as WIFI or BLUETOOTH.

In general, social-networking system 160 may identify a user device 410 of user 101 by communicating with a user device 410 via network 110. In some embodiments, a user device may be identified after the user device communicates with social-networking system 160. In some embodiments, social-networking system 160 may identify a first user device via communicating with a second user device. As an example, mobile device 410a may utilize WIFI or BLUETOOTH sniffing to capture a unique device identifier for TV 410e. The unique device identifier may include, for example, a MAC address, a serial number, a unique product identification number, an IP address, a multicast domain name system (mDNS) identifier, or any other data that may be used to identify the specific models or manufacturers of TV 410e. In some embodiments, a unique device identifier for TV 410e may be for a device associated with TV 410e. For example, a unique device identifier may identify a router that TV 410e is connected to, a STB that TV 410e is connected to, or any other device associated with TV 410e. In some embodiments, a unique device identifier for TV 410e may be an identifier assigned when a user device is paired with TV 410e (e.g., via BLUETOOTH). Once captured, the unique identifier for TV 410e may be analyzed by mobile device 410a or sent to social-networking system 160 for analysis. In some embodiments, the captured unique device identifier may be compared to a database of unique device identifiers in order to identify TV 410e. In particular embodiments, a user device may be identified passively without user input. Additionally or alternatively, a user device may be identified only if a user explicitly provides social-networking system 160 with identification information for the user device. In some embodiments, a notification may request that a user explicitly provide social-networking system 160 with identification information for a user device.

Social-networking system 160 may utilize the information obtained from user devices 410 to deliver specific content to a user device. For example, if social-networking system 160 determines that user 101 is utilizing an IPHONE as mobile device 410b, social-networking system 160 may communicate to laptop computer 410c to display advertisements directed to IPHONE users. As another example, if social-networking system 160 determines that user 101 is utilizing an XBOX as gaming console 410d, social-networking system 160 may communicate to personal computer 410a to display advertisements directed to XBOX users.

In particular embodiments, social-networking system 160 may also identify a user of a user device. In some embodiments, the identity of the user device may be used to identify a user by, for example, cross-referencing the identity of the user device with known user devices for the user. In other embodiments, the user may be identified by other means, such as by the user communicating authentication information to social-networking system 160. Social-networking system 160 may also access a user profile for the user of the identified user device. In particular embodiments, social-networking system 160 may store information indicating an association between a user device and a user.

Figure 5:
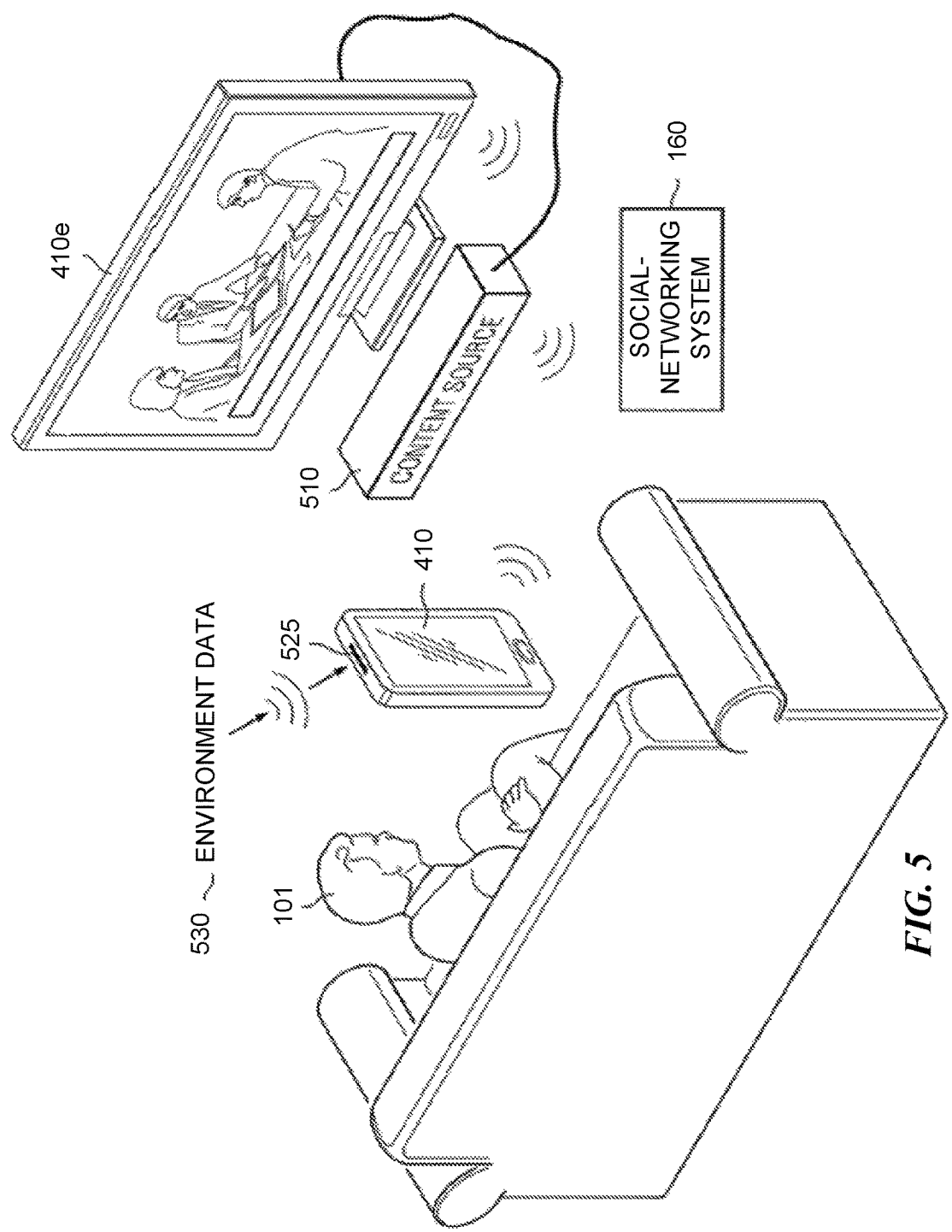
FIG. 5 illustrates an example environment in which a social-networking system may determine media consumption data.

FIG. 5 illustrates an environment in which social-networking system 160 may determine media consumption data. In particular embodiments, media consumption data may include the identity of the media content consumed. In some embodiments, media consumption data includes metadata about the media content which may identify a genre, air date, actor, artist, producer, director, content creator, content provider, television station or network, radio station or network, etc.

In particular embodiments, media consumption data may include a time, date, duration, or location for the consumption of the media content. For example, if user 101 consumed a television show by watching the show on a television, media consumption data may include the time and date that the user viewed the content. In some embodiments, time or date data may include the time or date that media content will be recorded, such as a time or date of a future recording set on a DVR. In some embodiments, duration data may include the duration that a particular user consumed media content. In some embodiments, media consumption data includes the location that media content is consumed or will be consumed.

In particular embodiments, media consumption data may include user input data. User input data may include, as an example and not by way of limitation, channel changing behavior, use of a remote control, clickstream data, user interactions with a media device, etc. For example, media consumption may include data that indicates that during a television show, user 101 muted the volume on TV 410e when advertisements were displayed. In this example, media consumption data may also indicate that user 101 unmuted TV 410e during particular advertisements. As a further example, media consumption data may indicate that user 101 clicked on an advertisement while consuming media using HULU on laptop 410c.

In particular embodiments, social-networking system 160 may receive media consumption data from user device 410. As discussed further below, social-networking system 160 may utilize various methods to determine media consumption data, such as the identity of what user 101 is watching on a media device, such as TV 410e. These methods may include acoustic or visual fingerprinting, analyzing electrical interference, analyzing signals on an HDMI cable, analyzing closed-captioning, analyzing images from an incoming video stream, analyzing explicit signals from user 101, and analyzing embedded signals, such as watermark data. In particular embodiments, media consumption data may be determined by capturing or analyzing data 530 via sensor 525.

In some embodiments, social-networking system 160 may determine device-based media consumption data. In particular embodiments, device-based media consumption data may be media consumption data associated with a particular user device. As an example, user 101 may be watching a show on TV 410e. Device-based media consumption for TV 410e may be media consumption data for the show being watched on TV 410e. In particular embodiments, social-networking system 160 may determine device-based media consumption data by determining an association between media consumption data and a user device. In the above example, TV 410e may communicate media consumption data to social-networking system 160 including a unique device identifier indicating an association between the media consumption data and TV 410e. As another example, user device 410 may capture media consumption data from TV 410e (e.g., by using an acoustic fingerprint) and also capture a unique identifier for TV 410e (e.g., via BLUETOOTH) which may indicate an association between the media consumption data and TV 410e. In this example, user device 410 may additionally or alternatively send with the media consumption data with a unique identifier for itself, indicating an association between the media consumption data and user device 410. In some embodiments, social-networking system 160 may determine media consumption data for user 101 by receiving data from TV 410e. For example, TV 410e may be an internet-enabled TV and may send media consumption data to social-networking system 160 via network 110.

In particular embodiments, social-networking system 160 may determine device-based media consumption data by receiving data from content source 510. As an example, content source 510 may be a content provider, such as an MSO 302 or an OTT provider 303. The content provider may collect and send to social-networking system 160 device-based media consumption data. In particular embodiments, a content provider may collect and send set-top box data to social-networking system 160. In particular embodiments, content source 510 may be STB/gateway 304c. For example, a set-top box may record media consumption data and send the data to social-networking system 160.

Figure 6:
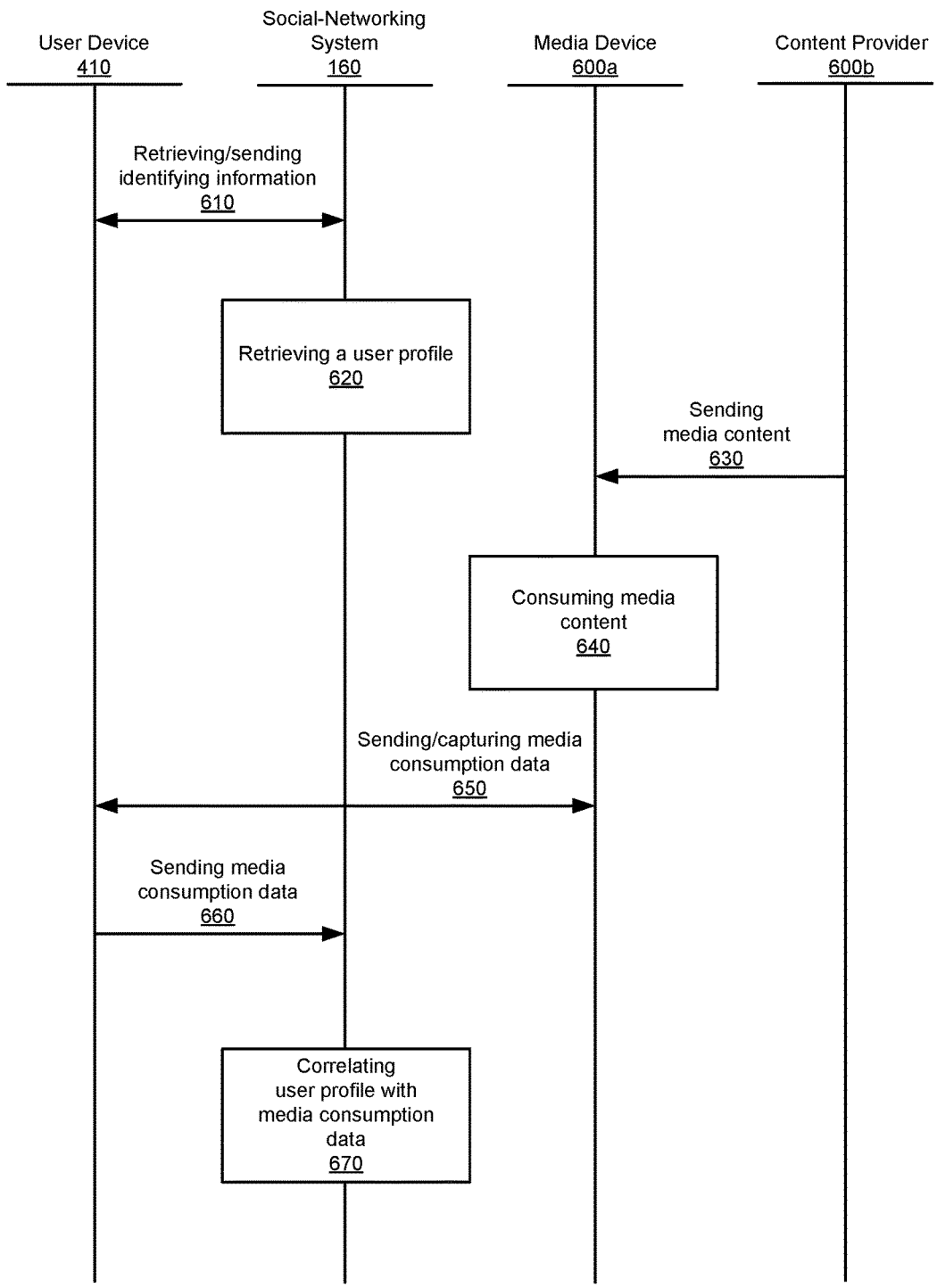
FIG. 6 illustrates an example method for correlating user profile data with media consumption data received from a user device.

FIG. 6 illustrates an example method for correlating user profile data with media consumption data received from user device 410. In step 610, user device 410 sends and social-networking system 160 receives identifying information (e.g., information sufficient to retrieve a user profile for a user of user device 410). In particular embodiments, identifying information may be authentication information (e.g., information uniquely identifying a user, such as a username, email address, or phone number), a unique device identifier for a user device of the user, or any other suitable information. In some embodiments, identifying information may include identifiers obtained via explicit pairing of a user device with a media device (e.g., a unique device identifier, an identifier assigned when a user device paired with a media device, etc.). In some embodiments, known information about a user, such as the user's interests, location, or other known information, may be identifying information. For example, social-network 160 may receive information that identifies a household, but then use known location for one or more members of the household to determine which member is correlated with media consumption data. In step 620, social-networking system 160 retrieves a user profile of the identified user.

In step 630, content provider 600b sends media content to media device 600a. In particular embodiments, a content provider may be an MSO, an OTT provider, a music streaming service (e.g. SPOTIFY, PANDORA INTERNET RADIO, etc.), a radio broadcaster, or any other provider of media content. In particular embodiments, media content may include video content, such as a TV show, a movie, a video game, a live video stream, etc. Additionally or alternatively, media content may include audio content, such as a radio broadcast, a podcast, an internet radio stream, a live audio stream, etc. In some embodiments, media content may include shared media collections (e.g., a photo album).

In particular embodiments, a media device may be a TV, a user device, or any other device capable of receiving or allowing a user to consume media content. In some embodiments, a media device may include a TV and a STB/gateway. This disclosure contemplates a media device including a device capable of receiving or consuming media content, any number of set-top boxes, and any number of gateway devices, connected in any suitable arrangement.

In step 640, the media content is consumed via media device 600a. In particular embodiments, a user may consume media content by viewing or listening to a media device that is producing sound or images corresponding to the media content. As an example, a user may consume media content by viewing a television show. In particular embodiments, consuming media content includes instructing a media device to record media content immediately or in the future. For example, a user may consume media content by instructing a media device that includes a TV and gateway device TIVO to record a television show. In particular embodiments, media content may be consumed when a user places media content in a queue or list. For example, a user may consume media by placing videos into a queue on NETFLIX.

In step 650, media consumption data may be sent from media device 600a to user device 410 or captured from media device 600a by user device 410. As discussed above, media consumption data may include the identity of the media content, metadata, a time, a date, a duration, a location, channel changing behavior, user input data, etc. In some embodiments, media consumption data may be sent to user device 410 via a wireless communications protocol such as WIFI or BLUETOOTH or by any other suitable means. In particular embodiments, discussed further below, user device 410 may capture media consumption data or information sufficient to determine media consumption data from media device 600a (e.g., by capturing audio, video, images, electrical interference patterns, and other such information from media device 600a).

In some embodiments, media consumption data may be captured by acoustic fingerprinting. For example, while user 101 is watching TV 410e, a mobile app associated with social-networking system 160 may be running on user device 410 of user 101. User device 410 may capture environmental data 530 (e.g., audio, images, video, location data, or other data captured from or associated with the environment) using a sensor 525 (e.g., a microphone, camera, GPS, or other sensor). Environmental data 530 may include, for example, audio from a show being viewed on TV 410e. In some embodiments, environmental data 530 may be sent to social-networking system 160, which may then analyze environmental data 530 in order to determine what user 101 is watching on the TV 410e, a time, date, or duration, or other media consumption data. For example, social-networking system 160 may compare environmental data 530 that includes environmental sounds to audio of known television shows. Based on the comparison, social-networking system 160 may determine media consumption data, such as the identity of a show user 101 is watching on TV 410e. In some embodiments, user device 410 may first analyze environmental data 530 and determine what the user is watching on TV 410e before sending data to social-networking system 160.

In some embodiments, social-networking system 160 may utilize environmental data 530 received from multiple users 101 in order to determine whether the multiple users are consuming media separately or together. For example, if two users are in the same room while watching the same TV show, environmental data 530 captured by each users' user device may be similar. Social-networking system 160 may compare environmental data captured from each user and determine that the two users are located in the same environment if the environmental data 530 from each user is substantially similar. As an example, social-networking system 160 may compare GPS or other location data determined via sensor 525 and sent by the users' user devices 410 in order to determine that two or more users are watching the same TV show at the same location. In some embodiments, social-networking system 160 may post content to social-networking system 160 indicating that the two users are watching the same TV show at the same location.

In some embodiments, media consumption data may be determined by visual fingerprinting. For example, environmental data 530 including images from an incoming video stream may be captured and analyzed to determine what a user is currently watching. For example, user 101 may use sensor 525 that includes a camera to capture images of a TV show being consumed on TV 410e. In some embodiments, the captured images may be sent to social-networking system 160. User device 410 or social-networking system 160 may analyze the captured images and compare them to a database of images for known media content. By comparing the captured images with the known images, social-networking system 160 or user device 410 may be able identify a TV show that user 101 is watching and thus determine media content.

In some embodiments, social-networking system 160 may utilize phase delay to determine media consumption data. For example, most cable providers utilize a unique time delay in sending signals to customers. Social-networking system 160 may determine this delay by, for example, analyzing environmental data 530 (e.g., environmental sounds or signals from an HDMI cable). Once the delay has been determined, social-networking system 160 may compare it to known delays of content providers. For example, if the delay is determined to be 102 ms, social-networking system 160 may determine that user 101 is watching content from COMCAST if COMCAST has a known delay of 102 ms. Once a content provider is determined, social-networking system 160 may determine media consumption data by cross-referencing environmental data 530 with known schedules of media content for the content provider (e.g., if user 101 is determined to be watching COMCAST at 6 PM, environmental data 530 may be compared to known data about shows being offered by COMCAST at 6 PM).

In some embodiments, electrical interference may be utilized to determine media consumption data. For example, media device 600a may include a connected device 304 plugged into an electrical outlet in the home of user 101. Media device 600a may also include a TV 410e plugged into the same electrical outlet, or any other electrical outlet in the home of user 101. The connected device 304 may capture electrical interference (e.g., noise) present on a power cord plugged into the electrical outlet. This electrical interference may be introduced into the electrical wiring of the user's home by TV 410e. The electrical interference may be due to variance in the electrical load from a television caused by varying sounds or volumes of a television show being displayed. In some embodiments, the electrical interference may be unique for each television show. This electrical interference pattern may be captured and sent to social-networking system 160 by the connected device 304. Social-networking system 160 may analyze the captured electrical interference pattern and compare it to a database of electrical interference patterns or fingerprints for known television shows. By comparing the captured electrical interference pattern with the stored electrical interference fingerprints, social-networking system 160 may be able match the captured pattern with the pattern of a television show and thus determine media consumption data for the media content being consumed by user 101.

In some embodiments, closed-captioning may be utilized to determine media consumption data. For example, STB/gateway 304c that is part of media device 600a may receive a video stream from content provider 600b that includes closed-captioning information. The STB/gateway 304c may analyze the video stream and capture closed-captioning information. The captured closed-captioning information may then be sent to social-networking system 160 where it may be analyzed and compared to closed-captioning data of known television shows. Based on the comparison, social-networking system 160 may match the captured closed-captioning information with closed-captioning of a known television show and thus determine media consumption data for the media content being consumed by a user.

In some embodiments, explicit signals embedded in the media content may be utilized to determine media consumption data. In some embodiments, an explicit signal may include a digital watermark, such as an audio or visual watermark. In some embodiments, a digital watermark may be imperceptible to humans without technological aid. For example, a content creator of a movie may embed an audio or visual watermark into the movie. The watermark may include information that identifies media consumption data for the content being displayed (e.g., title, episode number, time, date, etc.). User device 410 may capture all or part of the watermark data (e.g., via sensor 525), which may then be sent to social-networking system 160. Social-networking system 160 may then use data including all or part of the watermark to determine media consumption data for the media content being consumed by a user.

In some embodiments, social-networking system 160 may determine media consumption data by analyzing explicit signals from the users. For example, social-networking system 160 may analyze posts of user 101 on social-networking system 160 in order to determine what user 101 is or will be watching. As one example, if user 101 posts "I can't wait to watch 'Lone Survivor' tonight," social-networking system 160 may determine that user 101 is planning to consume the show "Lone Survivor." As another example, if two users are chatting about the show "Lone Survivor," social-networking system 160 may determine that the users are planning to consume the show "Lone Survivor." In some embodiments, explicit signals from a user may include a user pairing a user device with a media device. As an example, a user may explicitly pair a mobile phone with a TV via BLUETOOTH, and either the mobile device or the TV may send data to social-networking system 160 sufficient to determine media data.

In some embodiments, signals on an HDMI cable may be utilized to determine media consumption data. For example, a media device may include a connected device that captures electrical patterns of signals travelling across an HDMI cable. These electrical patterns may be unique for each particular piece of media content. The electrical patterns may be captured and sent to social-networking system 160. Social-networking system 160 may analyze the captured electrical patterns and compare them to a database of electrical patterns for known pieces of media content. By comparing the captured electrical patterns with the known electrical patterns, social-networking system 160 may be able match the captured patterns with the patterns of a particular media content and thus determine media consumption data for the media content being consumed by the user.

In step 660, user device 410 sends media consumption data to social-networking system 160. In some embodiments, user device 410 may send all or part of the data received in step 650. Additionally or alternatively, user device 410 may send media consumption data generated from the data received in step 650. In some embodiments, user device 410 may send data in step 660 that is the result of analyzing, processing, parsing, adding to, subtracting from, altering, or modifying the data received in step 650. In particular embodiments, the media consumption data may be, may be used to determine, or may be modified to be device-specific media consumption data.

In step 670, social-networking system 160 determines a correlation between the user profile retrieved in step 620 and the media consumption data received in step 660. In particular embodiments, the user profile may be correlated with the media consumption data by using the identifying information sent in step 610. For example, a software application may send the media consumption data, the identifying information, and data that indicates a correlation by indicating that that the media consumption data and the identifying information were sent by the same software application. As another example, and not by way of limitation, a mobile device and a TV may be paired via BLUETOOTH. In this example, an application on the mobile device may send data to social-networking system 160 that may determine a correlation, such as an IP address of a STB connected with the TV, a name for a WI-FI access point used by the TV or mobile device, or an identifier assigned during the pairing. In particular embodiments, the correlation may be determined because the same user device 410 sent both the identifying information and the media consumption data to social-networking system 160. For example, user device 410 may send media consumption data, identifying information, and in each case, also send a unique device identifier that indicates a correlation by indicating that both the media consumption data and the identifying information were sent from the same user device 410. In particular embodiments, there may be multiple users associated with a household or with a media device. In such cases, social-networking system 160 may determine which among the multiple users are correlated with media consumption data by using contextual information (e.g., a unique device identifier for a device associated with a particular user, an explicit signal from one of the users, a location of one of the users, or other such information).

In particular embodiments, social-networking system 160 may correlate the user profile with the media consumption data by storing user profile data indicating an association. In some embodiments, social-networking system 160 may merge the user profile and the media consumption data.

Figure 7:
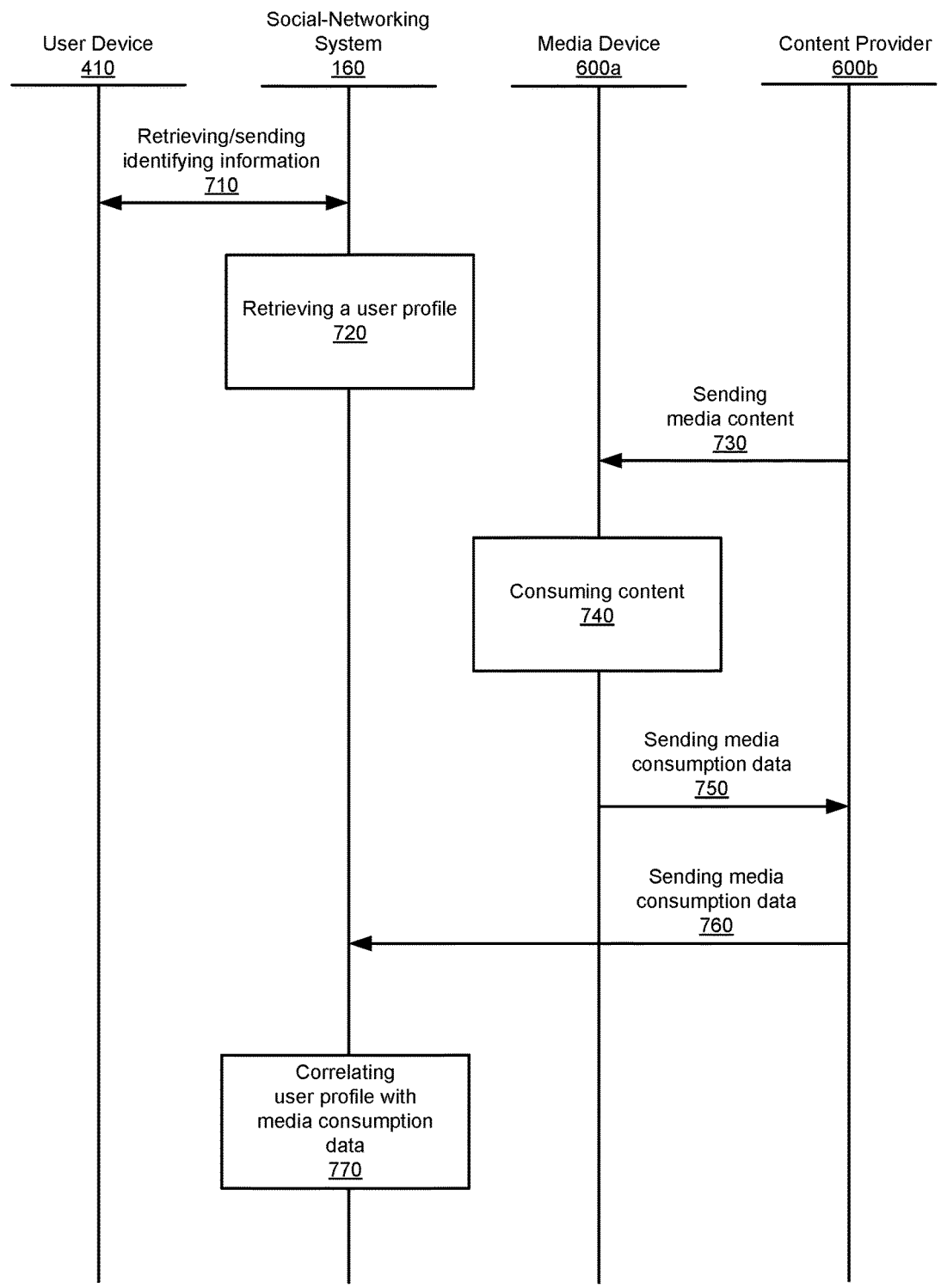
FIG. 7 illustrates an example method for correlating user profile data with media consumption data received from a content provider.

FIG. 7 illustrates an example method for correlating user profile data with media consumption data received from content provider 600b. In step 710, user device 410 sends and social-networking system 160 receives identifying information. In step 720, social-networking system 160 retrieves a user profile of the identified user. In step 730, content provider 600b sends media content to media device 600a. In step 740, the media content is consumed via media device 600a.

In step 750, media device 600a sends media consumption data to content provider 600b. In particular embodiments, media consumption data may include set-top box data. As an example, media device 600a may include TV 410e and a STB provided by an MSO content provider 600b. As user 101 consumes media using TV 410e, the STB may send set-top box data to the MSO. Set-top box data may indicate what channel the TV is tuned to, the identity of media content, information about the STB, a time or date, a viewing duration, remote control usage, channel changing behavior, user interactions with an EPG, user interactions with a video on demand (VOD) service, etc.

In particular embodiments, media consumption data may include user interactions with media device 600a, such as clickstream data. For example, media device 600a may include personal computer 410a. User 101 may consume media content using personal computer 410a, by, for example, using content provider NETFLIX. NETFLIX may record the user's interactions with personal computer 410a. For example, NETFLIX may receive data indicating that user 101 played part of a movie, added a television show into a queue, or searched for a particular cartoon using NETFLIX.

In step 760, content provider 600b sends media consumption data to social-networking system 160. In some embodiments, content provider 600b may send all or part of the data received in step 750. Additionally or alternatively, content provider 600b may send data generated from the data received in step 750. In some embodiments, content provider 600b may send data in step 760 that is the result of analyzing, processing, parsing, adding to, subtracting from, altering, or modifying the data received in step 750. In particular embodiments, the media consumption data may be, may be used to determine, or may be modified to be device-specific media consumption data.

In step 770, social-networking system 160 determines a correlation between the user profile retrieved in step 720 and the media consumption data received in step 760. In some embodiments, content provider 600b may send information to social-networking system in step 760 that allows social-networking system 160 to determine a correlation to user profile information. As an example, content provider COMCAST may send to social-networking system 160 media consumption data associated with media device 600a. In this example, COMCAST may also send information that would allow the identification of a user or a media device (e.g., a name, home address, MAC address for a media device, etc.). Social-networking system 160 may then use the information to correlate the media consumption data with the user profile. For example, if content provider 600b sends to social-networking system 160 media consumption data along with a user's name and location, social-networking may cross-reference the user's name and location with similar user profile information in a user profile to determine a correlation. As another example, the identifying information sent in step 710 and the media consumption data sent in step 760 may both include a unique device identifier for media device 600a or user device 410, which may indicate a correlation if cross-referenced with known media devices or user devices of a user. In some embodiments, multiple pieces or types of information may be used to determine a correlation. For example, a combination of IP address, mDNS identifier, WIFI name, unique identifier for a user device, unique device identifier for a user (e.g., an email address, phone number, etc.), or other suitable information may allow social-networking system 160 to determine a correlation to user profile information.

Figure 8:
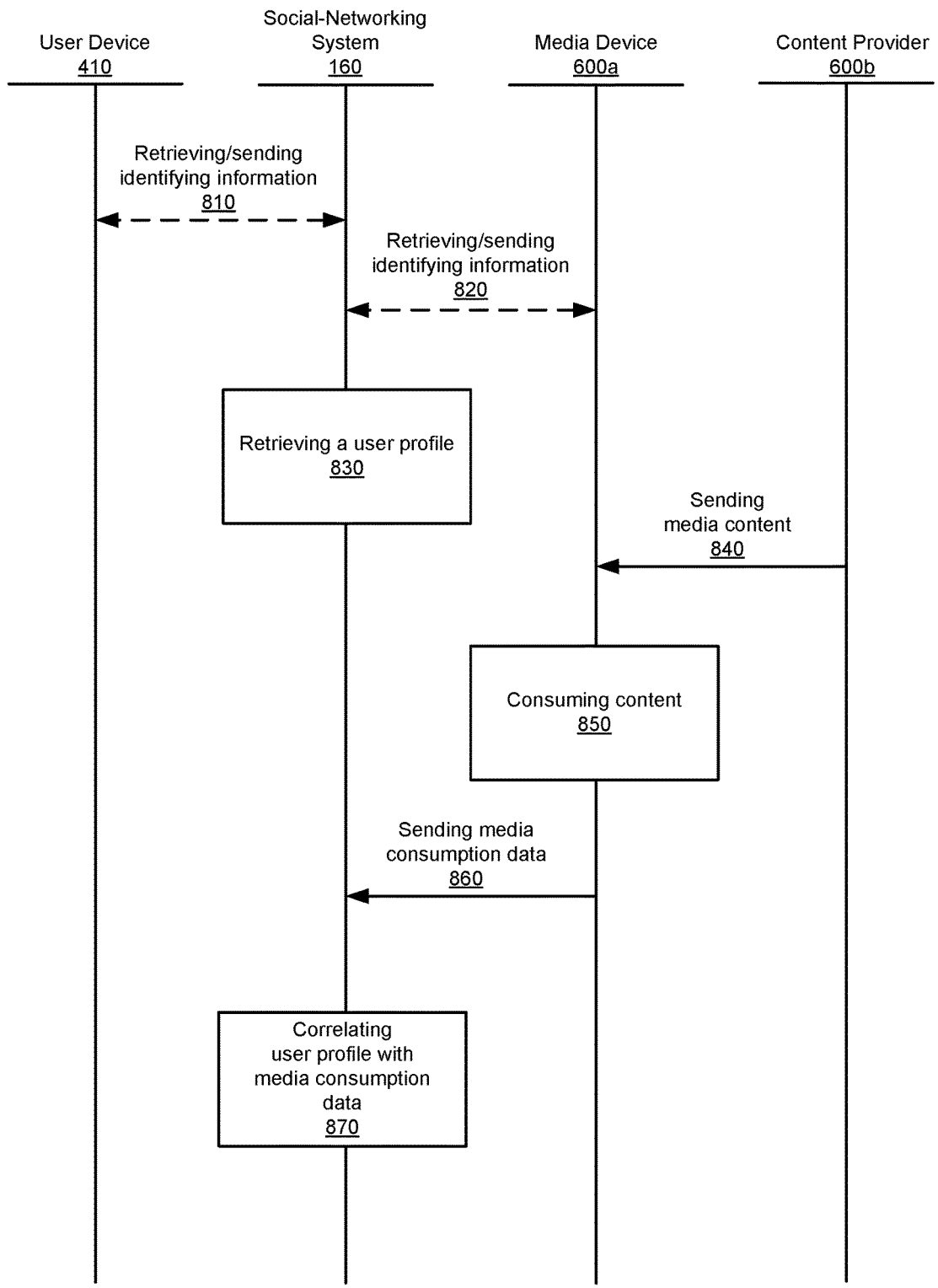
FIG. 8 illustrates an example method for correlating user profile data with media consumption data received from a media device.

FIG. 8 illustrates an example method for correlating user profile data with media consumption data received from media device 600a. In step 810, user device 410 sends and social-networking system 160 receives identifying information. In step 820, media device 600a sends and social-networking system 160 receives identifying information. In particular embodiments, identifying information may be authentication information (e.g., information uniquely identifying a user, such as a username, email address, or phone number), a unique device identifier for media device 600a, or any other suitable information. In particular embodiments, media device 600a may send identifying information directly to social-networking system 160, as depicted in FIG. 8. In other embodiments, media device 600a may send identifying information to social-networking system 160 via a user device 410. For example, user device 410 may utilize WIFI or BLUETOOTH sniffing to capture a unique device identifier from media device 600a and then send that information to social-networking system 160.

In step 830, social-networking system 160 retrieves a user profile of the identified user. The user may be identified based on identifying information sent from user device 410, identifying information sent from media device 600a, or a combination of the two. In particular embodiments, only step 810 or step 820 may occur. For example, identifying information may sent from media device 600a, but not from user device 410. Media device 600a may include a gateway device that communicates to social-networking system 160 via network 110. Media device 600a may send identifying information to social-networking system 160 sufficient to retrieve a user profile for the user of media device 600a. As another example, identifying information may sent from user device 410, but not from media device 600a. User device 410 may send identifying information to social-networking system 160 sufficient to retrieve a user profile for the user of user device 410. In step 840, content provider 600b sends media content to media device 600a. In step 850, the media content is consumed via media device 600a.

In step 860, media device 600a sends media consumption data to social-networking system 160. The media consumption data may include set-top box data, data indicating user interactions with media device 600a, or other media consumption data. For example, media device 600a may be an internet-enabled television. The internet-enabled television may send media consumption data to social-network system 160. In particular embodiments, the media consumption data may be, may be used to determine, or may be modified to be device-specific media consumption data.

In step 870, social-networking system 160 determines a correlation between the user profile retrieved in step 830 and the media consumption data received in step 860. In particular embodiments, the user profile may be correlated with the media consumption data by using the identifying information sent in step 810. Additionally or alternatively, the user profile may be correlated with the media consumption data by using the identifying information sent in step 820. For example, the identifying information sent in either step 810 or step 820 and the media consumption data may both include a unique device identifier for media device 600a, indicating a correlation.

Figure 9:
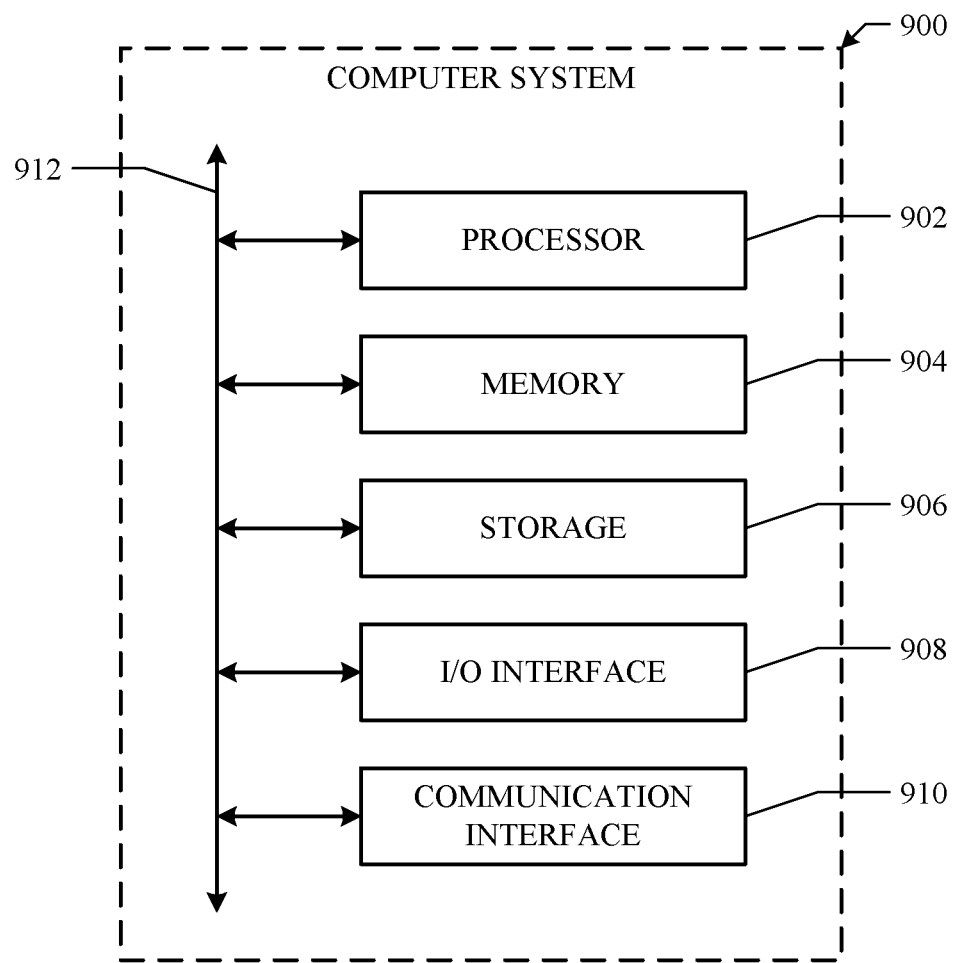
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by one or more computer systems of a social-networking system, retrieving a user profile for a user of the social-networking system, wherein the user is associated with a media device;
    by the one or more computer systems of the social-networking system, receiving media consumption data, wherein the media consumption data includes at least an identity of media content being consumed on the media device and environmental data captured by a user device uniquely identifying the media content being consumed on the media device;
    by the one or more computer systems of the social-networking system, correlating the user profile with the media consumption data;
    by the one or more computer systems of the social-networking system, determining that at least a portion of the media consumption data is device-based media consumption data and is associated with the media content being consumed on the media device based on the correlation between the user profile and the media consumption data; and
    by the one or more computer systems of the social-networking system, generating a customized set of content objects based on the device-based media consumption data for displaying to the user.

2. The method of claim 1, wherein the user profile is retrieved based on a unique device identifier for a user device associated with the user or based on authentication information for the user.

3. The method of claim 2, wherein the user device is the media device.

4. The method of claim 1, further comprising storing data associating the user profile with the device-based media consumption data.

5. The method of claim 1, wherein the environmental data comprises one or more of:
    an acoustic fingerprint;
    a video fingerprint;
    information about a phase delay;
    information about electrical interferences associated with the media device;
    information about closed-captioning associated with the content; or
    a digital watermark.

6. The method of claim 1, wherein the media consumption data comprises set-top box data.

7. The method of claim 6, wherein the set-top box data comprises one or more of:
    information indicating a television channel the media device is tuned to;
    information indicating the identity of the media content;
    information indicating a time or date associated with the media content;
    information indicating a viewing duration of the media content;
    information indicating use of a remote control; or
    information indicating channel changing behavior.

8. One or more computer-readable non-transitory storage media embodying software that is operable when executed to:
    retrieve a user profile for a user of a social-networking system, wherein the user is associated with a media device;
    receive media consumption data, wherein the media consumption data includes at least an identity of media content being consumed on the media device and environmental data captured by a user device uniquely identifying the media content being consumed on the media device;

correlate the user profile with the media consumption data;

determine that at least a portion of the media consumption data is device-based media consumption data and is associated with the media content being consumed on the media device based on the correlation between the user profile and the media consumption data; and generate a customized set of content objects based on the device-based media consumption data for displaying to the user.

9. The media of claim 8, wherein the user profile is retrieved based on a unique device identifier for a user device associated with the user or based on authentication information for the user.

10. The media of claim 9, wherein the user device is the media device.

11. The media of claim 8, further comprising to store data associating the user profile with the device-based media consumption data when executed.

12. The media of claim 8, wherein the environmental data comprises one or more of:
an acoustic fingerprint;
a video fingerprint;
information about a phase delay;
information about electrical interferences associated with the media device;
information about closed-captioning associated with the content; or
a digital watermark.

13. The media of claim 8, wherein the media consumption data comprises set-top box data.

14. The media of claim 13, wherein the set-top box data comprises one or more of:
information indicating a television channel the media device is tuned to;
information indicating the identity of the media content;
information indicating a time or date associated with the media content;
information indicating a viewing duration of the media content;
information indicating use of a remote control; or
information indicating channel changing behavior.

15. A system comprising: one or more processors; and a memory coupled to the processors comprising instructions executable by the processors, the processors being operable when executing the instructions to:

retrieve a user profile for a user of a social-networking system, wherein the user is associated with a media device;

receive media consumption data, wherein the media consumption data includes at least an identity of media content being consumed on the media device and environmental data captured by a user device uniquely identifying the media content being consumed on the media device;

correlate the user profile with the media consumption data;

determine that at least a portion of the media consumption data is device-based media consumption data and is associated with the media content being consumed on the media device based on the correlation between the user profile and the media consumption data; and generate a customized set of content objects based on the device-based media consumption data for displaying to the user.

16. The system of claim 15, wherein the user profile is retrieved based on a unique device identifier for a user device associated with the user or based on authentication information for the user.

17. The system of claim 16, wherein the user device is the media device.

18. The system of claim 15, further comprising to store data associating the user profile with the device-based media consumption data when executing the instructions.

* * * * *